United States Patent [19]

Piccotti

[11] Patent Number: 4,727,739
[45] Date of Patent: Mar. 1, 1988

[54] BOX TO SEPARATE ROLLED STOCK

[75] Inventor: Claudio Piccotti, Gorizia, Italy

[73] Assignee: Danieli & C. Officine Meccaniche SpA, Buttrio, Italy

[21] Appl. No.: 853,556

[22] Filed: Apr. 18, 1986

[30] Foreign Application Priority Data

Apr. 22, 1985 [IT] Italy ............... 83359 A/85

[51] Int. Cl.⁴ .................................. B21B 1/00
[52] U.S. Cl. ........................ 72/203; 72/250; 83/503
[58] Field of Search ............... 83/500, 503, 663, 675; 72/203, 204, 250, 251

[56] References Cited

U.S. PATENT DOCUMENTS

| | | | |
|---|---|---|---|
| 3,817,072 | 6/1974 | Balve | 72/250 |
| 4,187,710 | 2/1980 | Stikeleather | 72/204 |
| 4,434,695 | 3/1984 | Wingen | 83/503 |
| 4,587,702 | 5/1986 | Kates | 72/203 |

Primary Examiner—W. D. Bray
Attorney, Agent, or Firm—Wegner & Bretschneider

[57] ABSTRACT

A box to separate rolled stock, having a frame, an inlet guide, a pair of specially shaped rolls, and a device that, with one activation, can adjust both rolls in order to change the distance between the centers of the rolls.

9 Claims, 3 Drawing Figures

BOX TO SEPARATE ROLLED STOCK

This invention concerns a box to separate rolled stock, the box being of a type which can be employed in hot rolling lines.

The box to separate rolled stock is applied immediately downstream of a pair of rolling rolls.

The splitting of the rolled stock into two portions sliding parallel to each other is performed by specially shaped rolls which, according to the invention, are interchangeable and fitted cantilever-wise.

The invention provides for an improved regulation of such rolls and for improved means to guide the departing rolled stock.

Methods for splitting the rolled stock in which static blades are employed are known. Such blades entail the drawback of becoming easily and readily worn; moreover, the action of splitting the rolled stock is not as progressive as it is when the blades are rotating.

Embodiments are also known which employ specially shaped rolls, that is to say, a pair of specially shaped rolls to split the rolled stock.

Some known systems, in carrying out the splitting of rolled stock of differing dimensions, provide for the whole separation box to be replaced or for the set of shaped rolls to be replaced, the distance between centers of such rolls being unchangeable.

Other embodiments provide for separate adjustment of the two shaped rolls, for instance by means of independent screws or like means for the two blades.

U.S. Pat. No. 1,881,020 discloses a box to separate rolled stock which functions similar to that of the invention in question. This U.S. document provides blades 10 which cooperate with conditioning rolls 14. Such a system cannot be employed in modern rolling processes.

U.S. Pat. No. 2,191,148 discloses a system for multiple duplication, starting with a flat rolled product, but this system can be used only where cold processing is to be employed.

FR No. 2.351.746 discloses a box to separate rolled stock which can be likened to that of the present invention but which entails a plurality of limitations.

Boxes of known types, therefore, entail adjustment problems and also problems related to generally complex construction. Furthermore, the replacement of worn blades is not undertaken at once as part of the box has to be dismantled to perform such replacement.

A purpose of this invention is to overcome the problem of regulation of the distance between centers of shaped rolls that split the rolled stock.

Another purpose of this invention is to fit the rolls cantileverwise so as to simplify replacement and maintenance as much as possible.

The invention provides for regulation means which consists of one single worm screw acting simultaneously on two eccentric bushings respectively of one and the other shaped blades or rolls.

By means of their rotation, which is actuated, as we said above, by the worm screw, the eccentric bushings cause the reciprocal displacement of the shaped blades. In this way the rolling axis is kept unchanged.

This enables the distance between centers of the shaped rolls that split the rolled stock to be set simply and at once.

Actuation of such setting is obtained preferably by means of a shank equipped with a clamping fork.

Maintenance and replacement of the shaped blades are considerably simplified since such blades, as we said earlier, are fitted as cantilevers. To replace the blades it is therefore enough to slacken the fixture means, for instance a nut, of the blade rotating on its relative axis.

So as to enable the eccentric bushings to be accurately positioned and any play to be taken up automatically, thus obviating the risk of undesired twisting of the blades and of oscillations and vibrations, the invention arranges for the bushings to be kept in position by pre-loaded springs.

In this way, very tight working tolerances do not have to be used and a firm, stable positioning of the eccentric bushings is obtained.

Such bushings are contained in a frame closed with a cover that has the function also of pre-loading the springs. Such springs are preferably and advantageously Belleville washers.

The invention provides also for a pair of outlet guide rolls, which are staggered in relation to each other and have the task of absorbing a part of the splitting stress and of guiding the rolled sections downstream of the splitting area.

The inlet guides of the box, the shaped splitting rolls and the staggered outlet guide rolls are cooled with jets of a liquid in a conventional manner.

This invention is therefore embodied in a box to separate rolled stock, which comprises a frame, an inlet guide and a pair of specially shaped rolls, and is characterized in that such shaped rolls include means to regulate the distance between the centers of the rolls with one single actuation to regulate both rolls at one and the same time.

We shall describe hereinafter, as a non-restrictive example, a preferred embodiment of the invention with the help of the attached figures, in which.

In the figures a box 10 to separate rolled stock is located immediately downstream of a pair of rolling rolls 11. The box 10 comprises a bearing frame 14, which contains a specially shaped guide 12 in its front portion. In the example shown such guide 12 is shaped like a dummbell according to the preferred section of the rolled stock entering the box.

Figure 3:
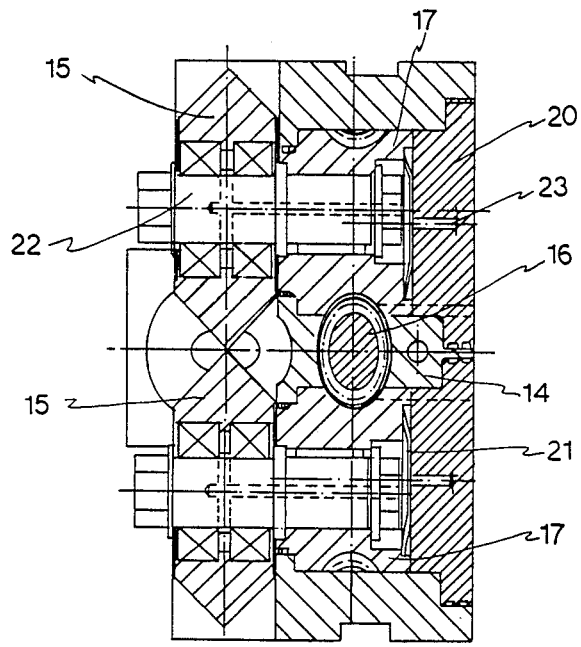
FIG. 3 shows a section along the line A—A of FIG. 1.

Frontal sprayers 13 to spray liquid for cooling the rolling rolls are shown, as also are two specially shaped rolls or blades 15 which perform the splitting of the rolled stock and of which the distance between the centers can be regulated by means of eccentric bushes 17 (FIG. 3).

The bushings 17 are lodged within the frame 14, and each of them supports a shaft 22 which, by means of a suitable bearing, supports in its turn its respective shaped roll 15 as a cantilever.

Adjustment of the distance between centers of the shaped rolls is performed by simultaneous rotation of the eccentric bushings 17. According to the invention such rotation is actuated by one single worm screw 16, which in the example shown is positioned obliquely to the direction of sliding of the rolled stock. In a variation, which has not been shown, the worm screw 16 can be positioned horizontally.

In the figure the worm screw 16 includes an actuation shank 18, in correspondence with which is included a clamping fork 19 to prevent undesired displacements from the preselected position as a result of accidental actuation of the shank 18.

According to the invention the frame 14 is closed at its rear by a cover 20, which has the task of pre-loading two Belleville washers 21 when it is closed. Each washer 21 is located in correspondence with its respective eccentric bushing 17.

In this way the bushings are pre-loaded and thus take up any play between the bushings 17 and the frame 14. Any accidental twisting or vibration of the rolls 15 is thus obviated.

Lubrication ducts 23 are shown which deliver lubricating fluid in a known manner to the bearing of the rolls 15.

The figure also shows a cooling liquid inlet 25 which feeds liquid to the sprayers 13.

A separator 25 is included immediately downstream of the shaped rolls 15 and has the task of guiding and separating the two rolled products obtained by splitting.

Figure 1:
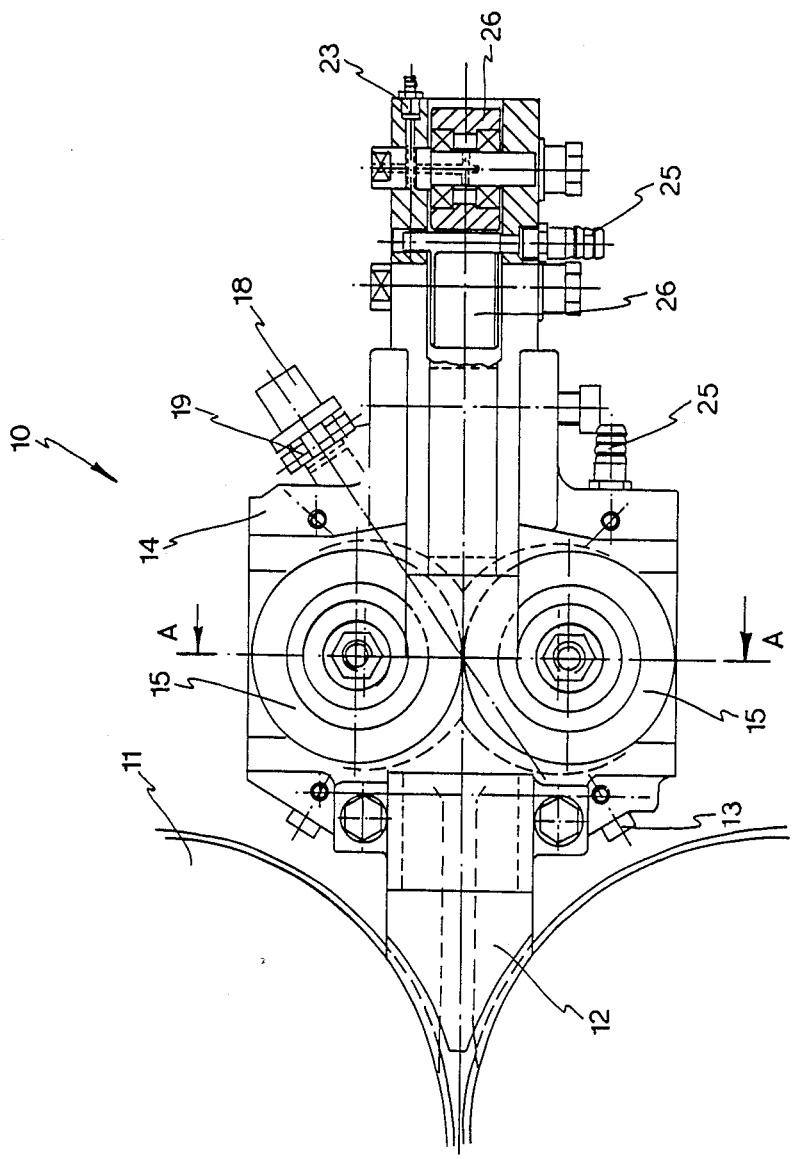
FIG. 1 is a side view of a box to separate rolled stock according to the invention, the box being located immediately downstream of a pair of rolling rolls.
Figure 2:
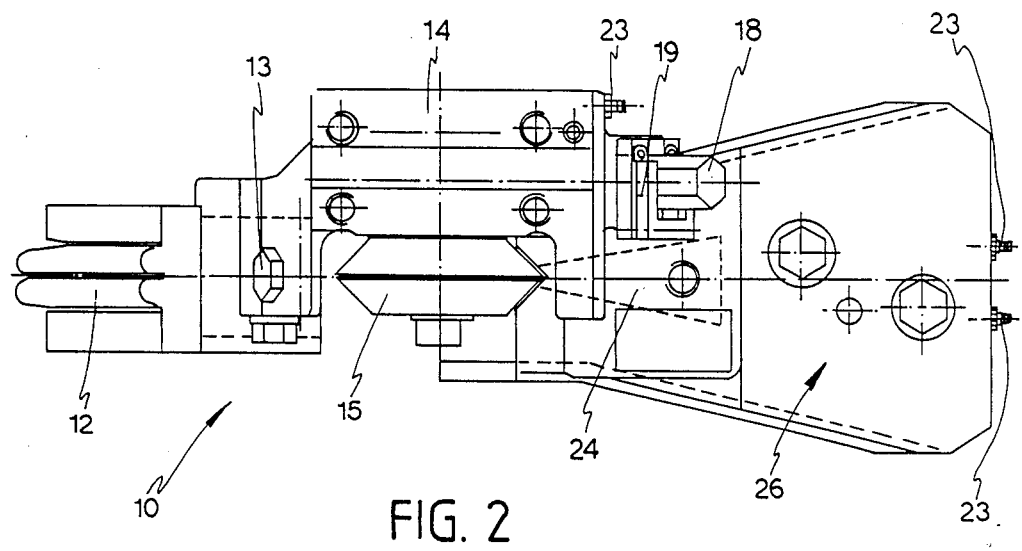
FIG. 2 is a plan view of the box of FIG. 1.

Two outlet guide rolls 26 are located downstream of the separator 25 and are shown in greater detail in FIG. 1, where the rear portion of the frame 14 has been partially cutaway in correspondence with the outlet rolls 26.

These outlet rolls 26 are staggered so as to make possible nonexcessive separation of the two rolled products obtained. Such outlet rolls 26 absorb a part of the stress of splitting the rolled product and thus prevent premature wear and replacement of the shaped splitting rolls 15; the outlet rolls 26 too are provided with lubrication through ducts 23 and are cooled with jets of water, the feed system of the water being referenced with 25.

The invention operates as follows: the rolled stock enters the box 10 from rolling rolls 11 over guide 12. The rolling stock is split by the rolls 15, separated by the separator 24 and guide rolls 26, and fed onward for further processing.

As can be seen in the figures, the invention makes possible a ready and easy access to the shaped rolls 15 and an easy replacement of the same, such rolls 15 being fitted as cantilevers.

The invention also enables the eccentric bushings 17 to be maintained easily and, as is shown in the figures, simplifies the actuation of the regulation, since it is enough to act on the shank 18 so as to adjust the distance between centers of the shaped rolls 15 while keeping the rolling axis constant.

Thus the setting of the box 10 of the invention presents no difficulty and can be actuated at once.

We have described here a preferred embodiment of the invention, but variations are possible without departing thereby from the scope of the idea of the solution.

Thus the shapes and sizes of the parts can be modified, and blades or rollers 15 shaped otherwise than as shown can be employed. An actuation means 18 different from the shank illustrated can be adopted, as also can safety means other than the clamping fork 19; it is possible to employ springs of a type different from the Belleville washers 21. These and other variations are all possible without departing thereby from the scope of the invention.

I claim:

1. A box to separate rolled stock, comprising:
   a frame;
   an inlet guide mounted to the frame;
   a pair of specially shaped rolls to split the rolled stock into two portions; and
   means for supporting the rolls within the frame and for adjusting the distance between the centers of the rolls, said supporting and adjusting means being able to move both rolls with respect to the frame at the same time.

2. A box as claimed in claim 1, further comprising a pair of outlet guide rolls mounted to the frame, staggered in relation to each other, located downstream of said specially shaped rolls.

3. A box as claimed in claim 1, wherein said specially shaped rolls are mounted on shafts which are supported by said supporting and adjusting means only at one end.

4. A box to separate rolled stock, comprising a frame, an inlet guide mounted to the frame, a pair of specially shaped rolls to split the rolled stock into two portions, each roll being mounted on a shaft, and an adjusting means for adjustably supporting the rolls and shafts within the frame, said adjusting means comprising two eccentric bushings located within the frame, each of which supports one of the shafts, and a worm screw which, when actuated, moves both rolls with respect to frame, thereby adjusting the distance between the rolls.

5. A box as claimed in claim 4, wherein said frame has a removable cover and said box further comprises preloaded springs interposed between the cover and the eccentric bushings.

6. A box as claimed in claim 4, wherein said worm screw has its axis tilted in relation to the rolling axis.

7. A box as claimed in claim 4, wherein said worm screw has its axis parallel to the rolling axis.

8. A box as claimed in claim 4, wherein said worm screw includes an actuation shank.

9. A box as claimed in claim 8, further comprising a safety means to prevent said actuation shank from turning during operation.

* * * * *